(12) United States Patent
Shihoh

(10) Patent No.: US 10,180,557 B2
(45) Date of Patent: Jan. 15, 2019

(54) CORRECTING OPTICAL DEVICE, IMAGE DEFLECTION CORRECTING DEVICE AND IMAGING DEVICE

(71) Applicant: CANON KABUSHIKI KAISHA, Tokyo (JP)

(72) Inventor: Makoto Shihoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 580 days.

(21) Appl. No.: 14/762,776

(22) PCT Filed: Jan. 8, 2014

(86) PCT No.: PCT/JP2014/000043
§ 371 (c)(1),
(2) Date: Jul. 22, 2015

(87) PCT Pub. No.: WO2014/115490
PCT Pub. Date: Jul. 31, 2014

(65) Prior Publication Data
US 2015/0362695 A1    Dec. 17, 2015

(30) Foreign Application Priority Data
Jan. 25, 2013 (JP) ................. 2013-012313

(51) Int. Cl.
*G03B 3/02* (2006.01)
*G02B 7/02* (2006.01)
(Continued)

(52) U.S. Cl.
CPC .......... *G02B 7/023* (2013.01); *G02B 27/646* (2013.01); *G03B 5/00* (2013.01); *H04N 5/2254* (2013.01);
(Continued)

(58) Field of Classification Search
CPC .......... G02B 27/64; G03B 17/00; G03B 3/02; H04N 5/228
(Continued)

(56) References Cited

U.S. PATENT DOCUMENTS

| 8,441,725 B2 | 5/2013 | Yasuda |
| 2006/0082674 A1 | 4/2006 | Noji |

(Continued)

FOREIGN PATENT DOCUMENTS

| CN | 101067709 A | 11/2007 |
| CN | 101207343 A | 6/2008 |

(Continued)

*Primary Examiner* — Clayton E Laballe
*Assistant Examiner* — Fang-Chi Chang
(74) *Attorney, Agent, or Firm* — Canon USA, Inc., IP Division

(57) ABSTRACT

A correcting optical device including: a fixing member; a rotating member; a movable member; first and second drive units; and at least first and second contact members. For the regulation of movement of the movable member, rotational driving force is produced by the first and second drive units and, the rotating member is rotated in the opposite direction of the rotational direction of the movable member after the movable member is rotated to be brought into contact with the first contact member, whereby translational movement of the movable member is regulated. For image deflection correction, rotational driving force in the opposite direction of the rotational force is produced and, the rotating member is rotated in the opposite direction of the rotational direction of the movable member after the movable member is rotated to be brought into contact with the second contact member, whereby regulation on the movable member is released.

28 Claims, 12 Drawing Sheets

(51) Int. Cl.
*G03B 5/00* (2006.01)
*H04N 5/225* (2006.01)
*G02B 27/64* (2006.01)

(52) U.S. Cl.
CPC .......... *G03B 2205/0015* (2013.01); *G03B 2205/0053* (2013.01)

(58) Field of Classification Search
USPC ............ 396/55; 359/557; 348/208.11
See application file for complete search history.

(56) References Cited

U.S. PATENT DOCUMENTS

| | | | |
|---|---|---|---|
| 2009/0180769 A1* | 7/2009 | Mizuta | G03B 17/00 396/55 |
| 2012/0154912 A1 | 6/2012 | Shihoh | |
| 2013/0076922 A1* | 3/2013 | Shihoh | G02B 27/64 348/208.4 |

FOREIGN PATENT DOCUMENTS

| | | |
|---|---|---|
| CN | 101373936 A | 2/2009 |
| CN | 101567644 A | 10/2009 |
| JP | 3397536 B2 | 4/2003 |
| JP | 2010-204276 A | 9/2010 |
| JP | 2011-013614 A | 1/2011 |
| JP | 2012-130231 A | 7/2012 |
| JP | 2012-133040 A | 7/2012 |
| JP | 2012-215605 A | 11/2012 |

* cited by examiner

[Fig. 1]
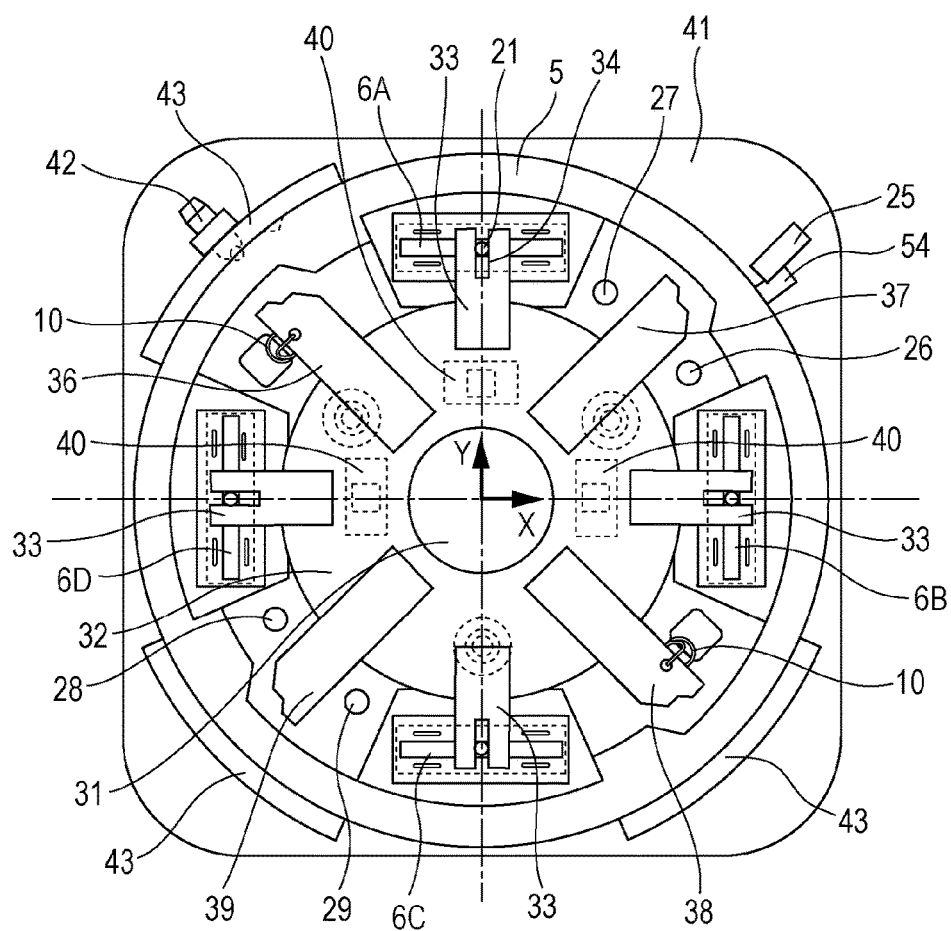

[Fig. 2]
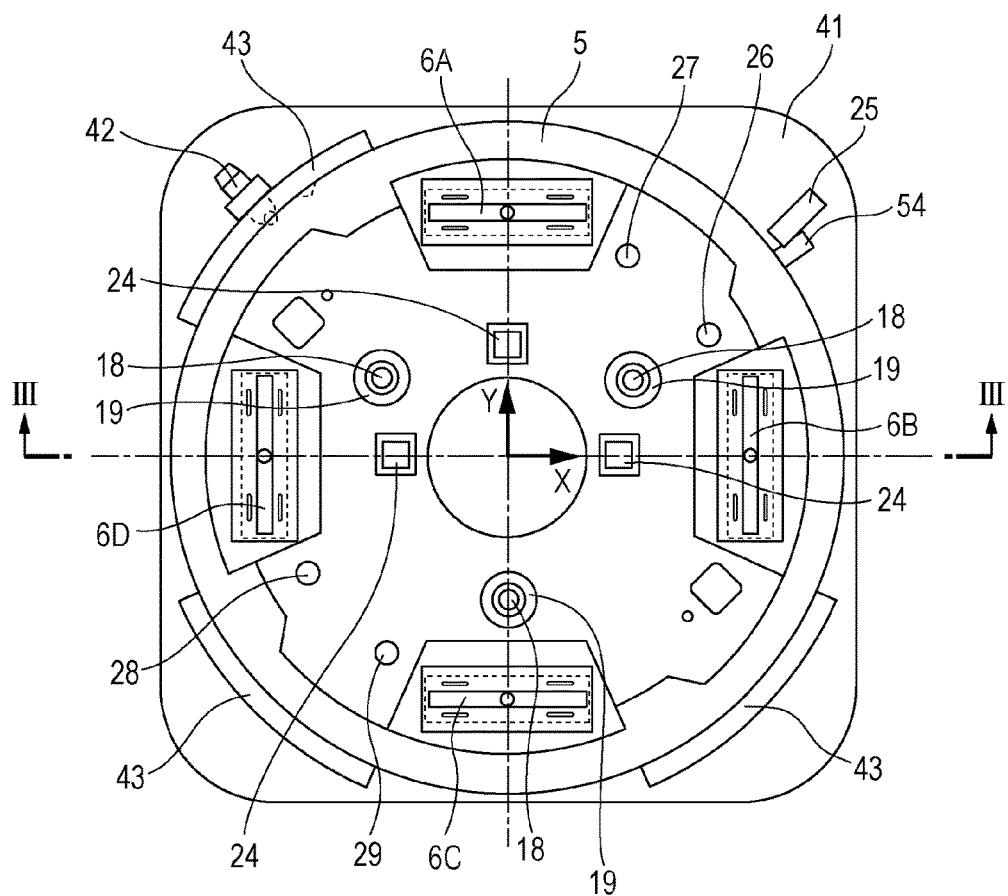
[Fig. 3]
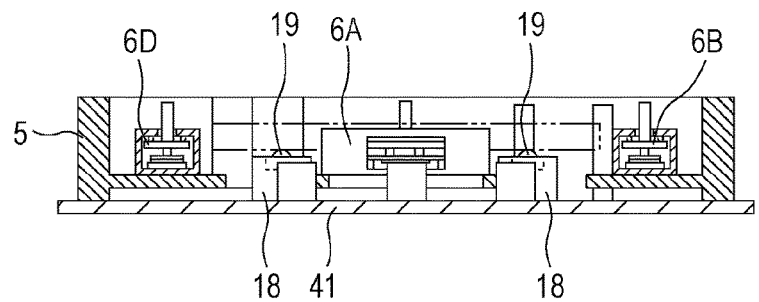

[Fig. 4]
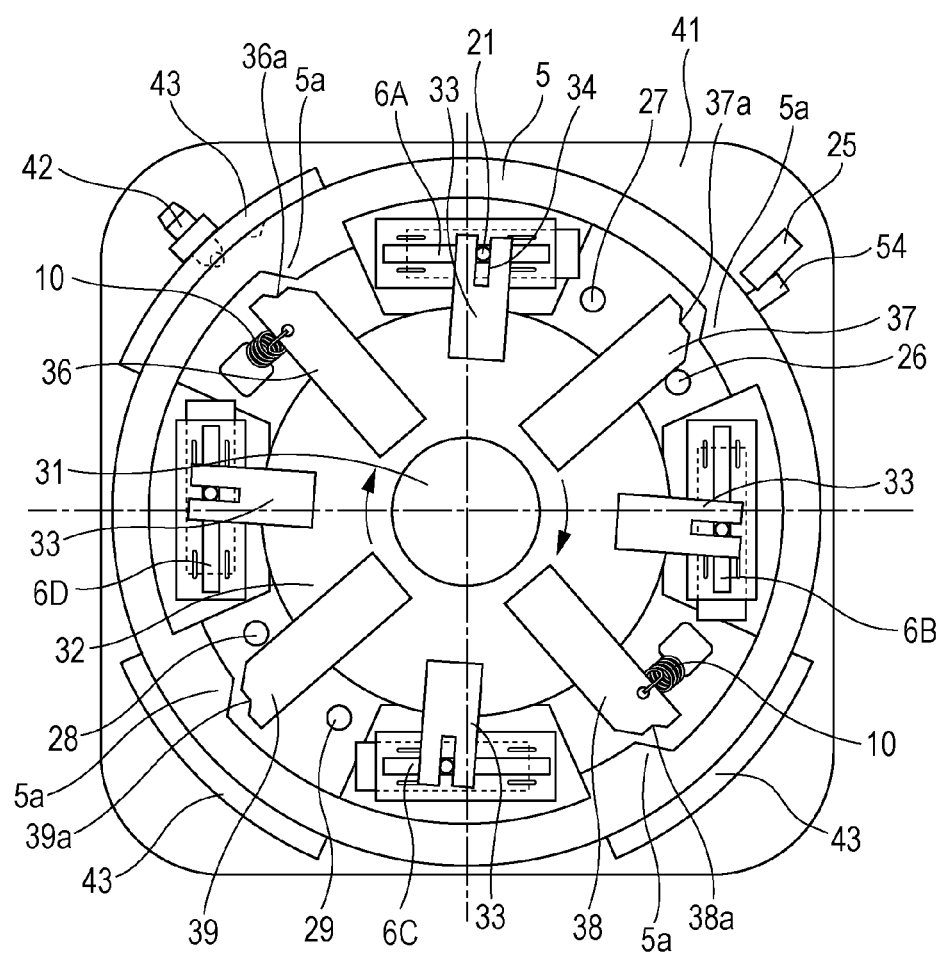

[Fig. 5]
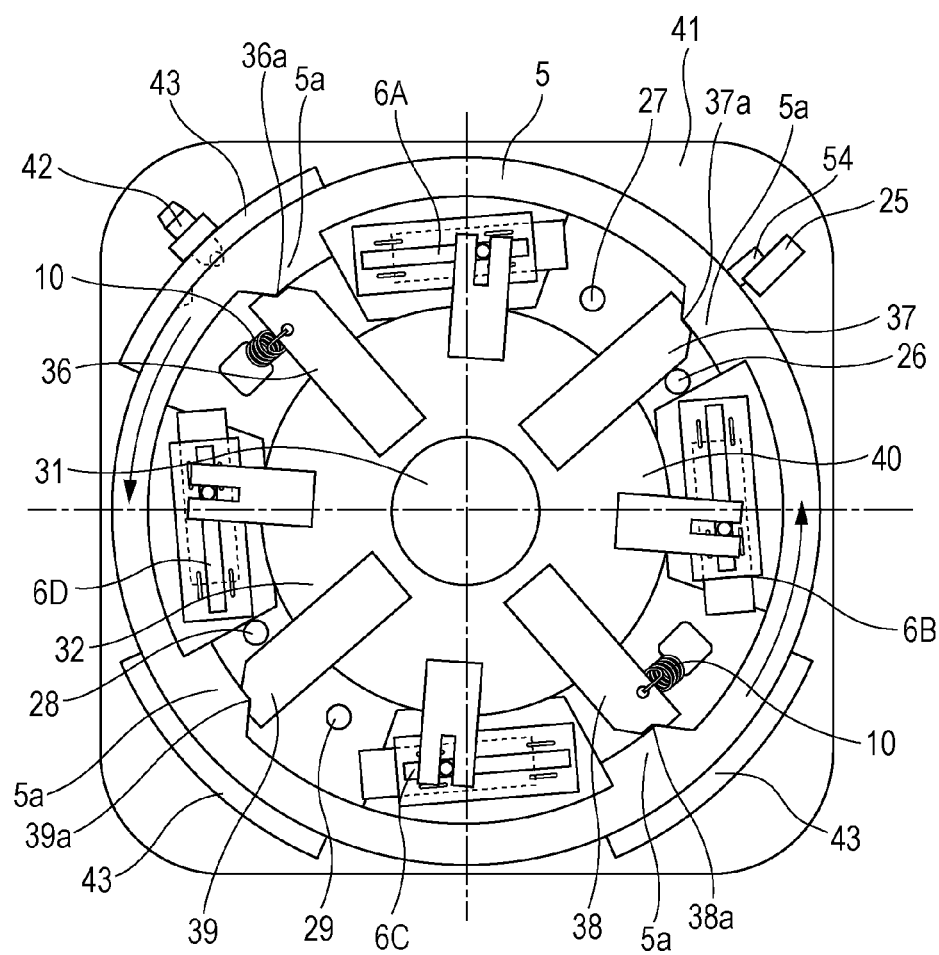

[Fig. 6]
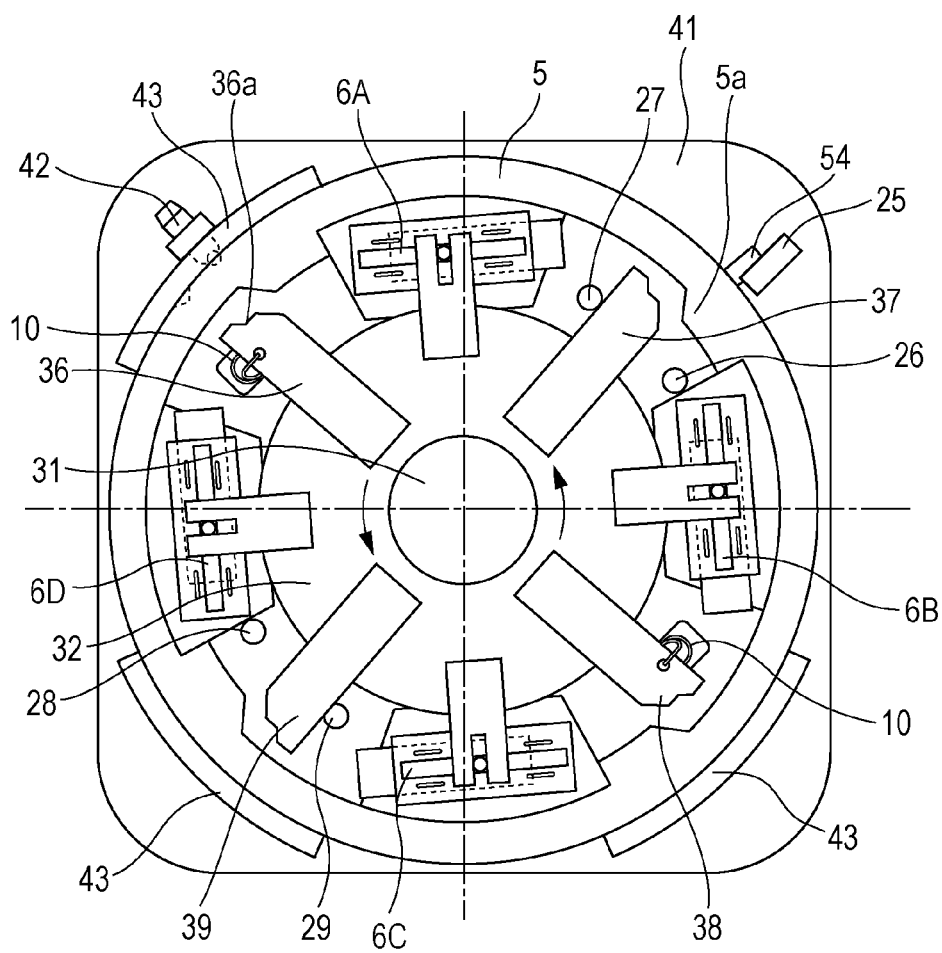

[Fig. 7]
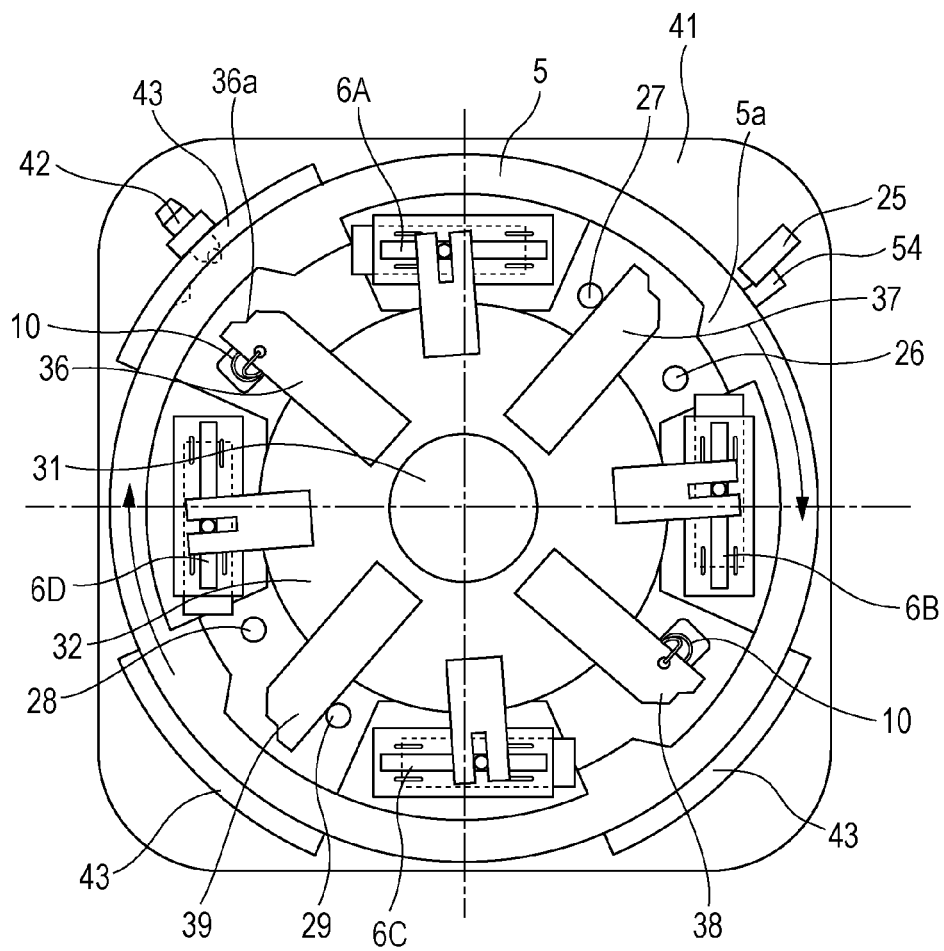
[Fig. 8A]
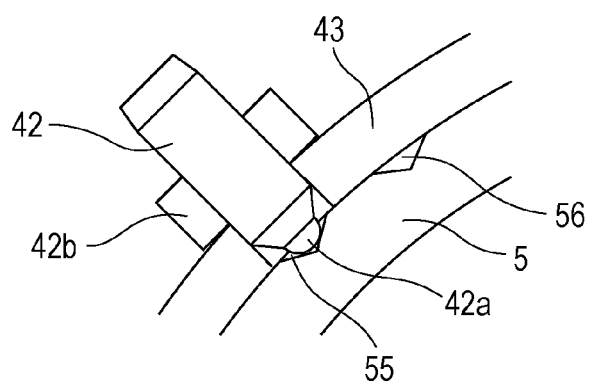

[Fig. 8B]
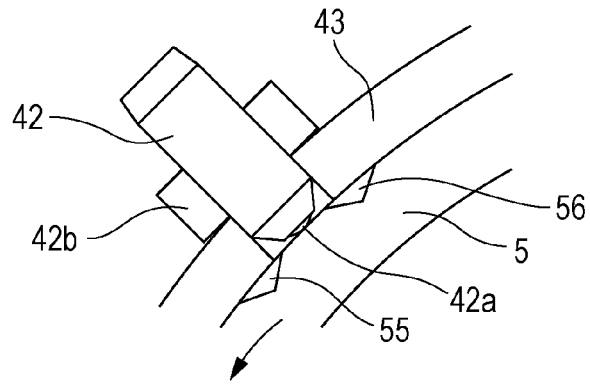
[Fig. 8C]
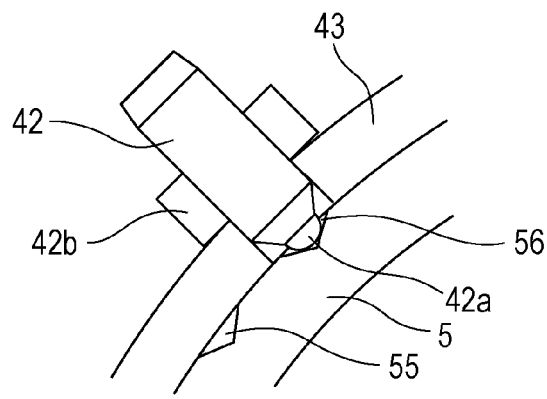
[Fig. 9]
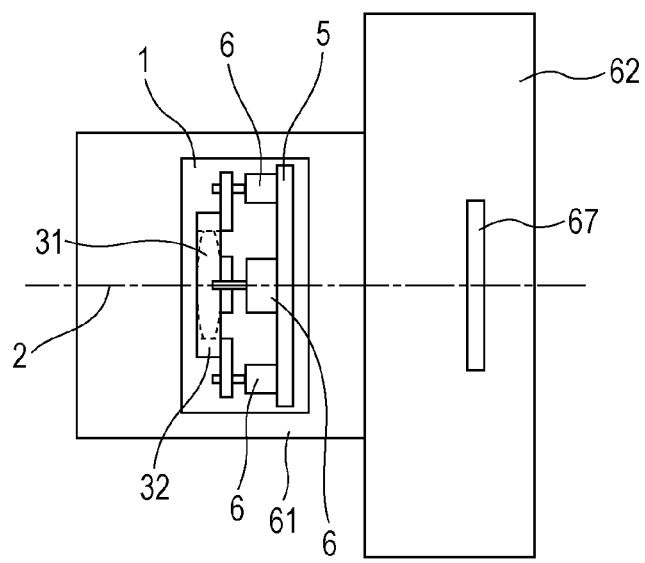

[Fig. 10A]
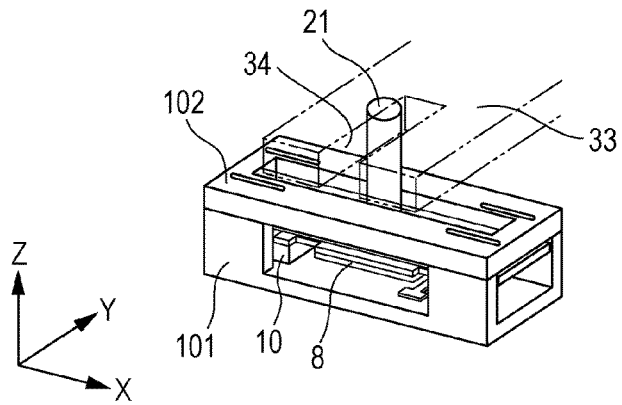
[Fig. 10B]
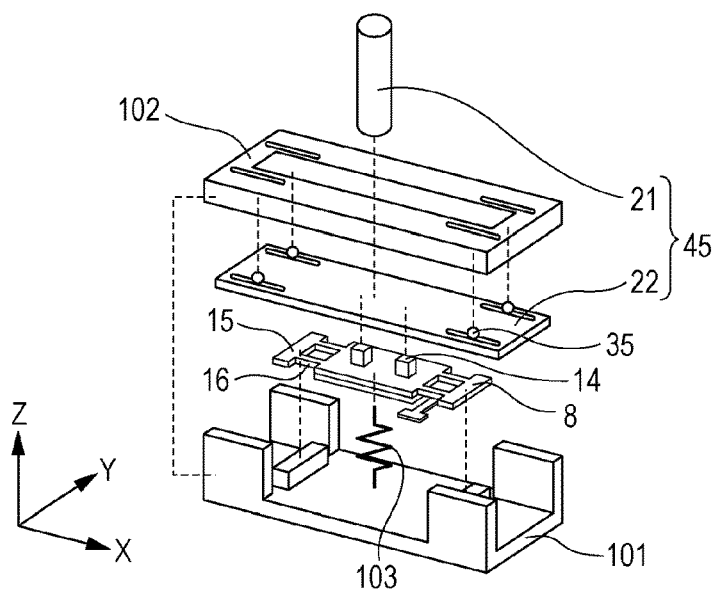
[Fig. 11A]
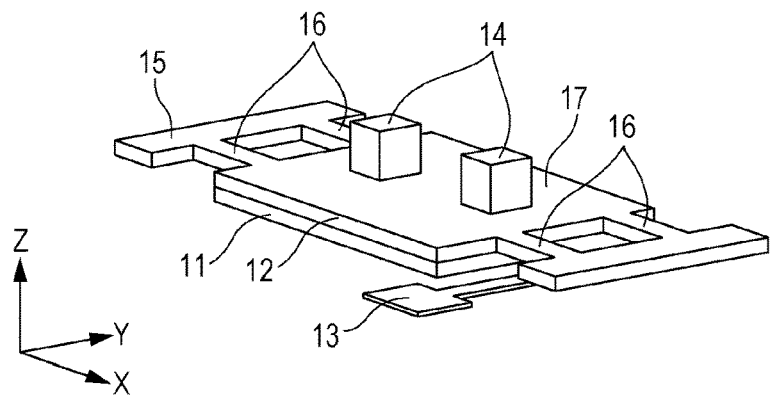

[Fig. 11B]
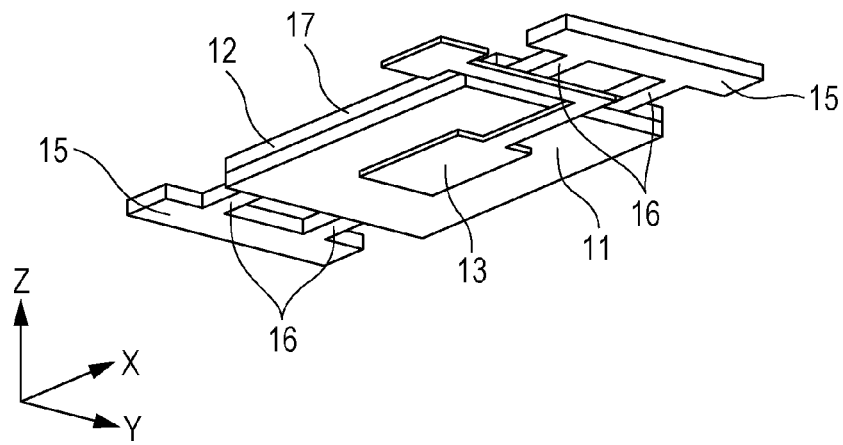
[Fig. 12A]
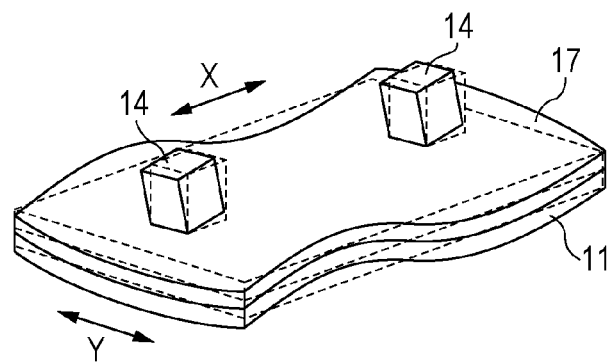
[Fig. 12B]
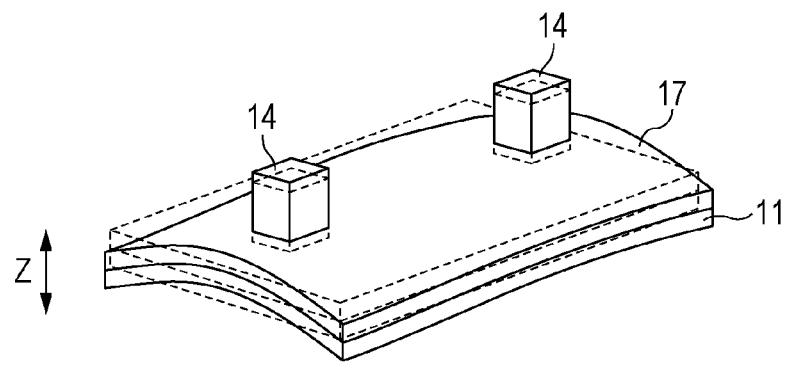

[Fig. 13A]
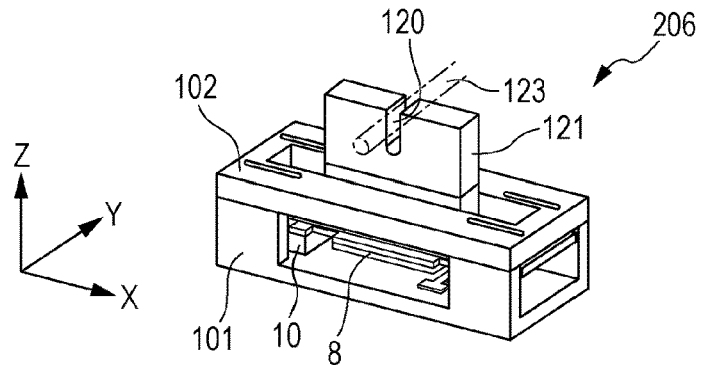
[Fig. 13B]
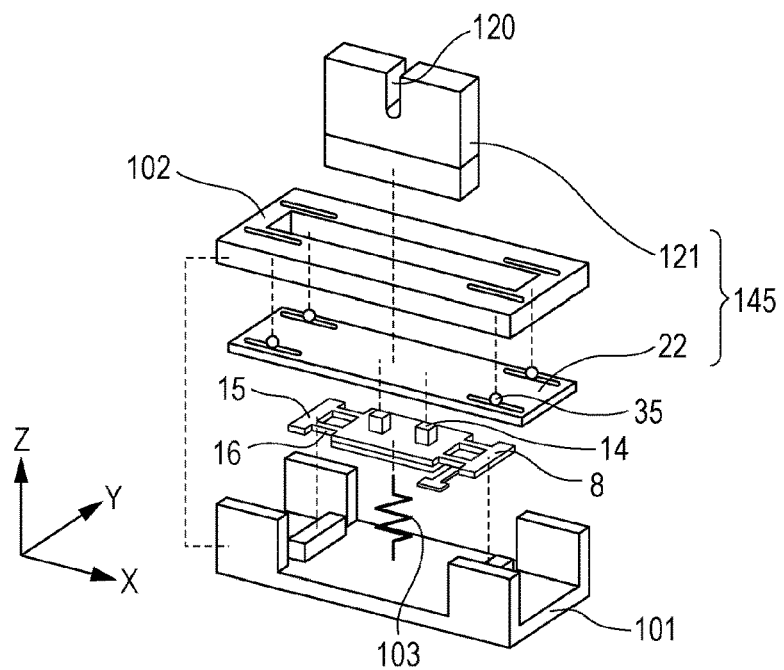
[Fig. 13C]
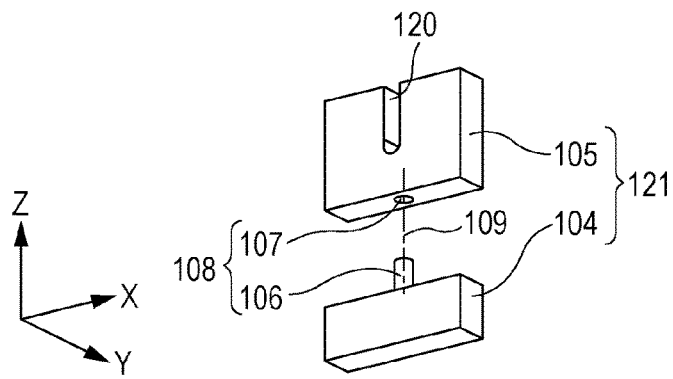

[Fig. 14]
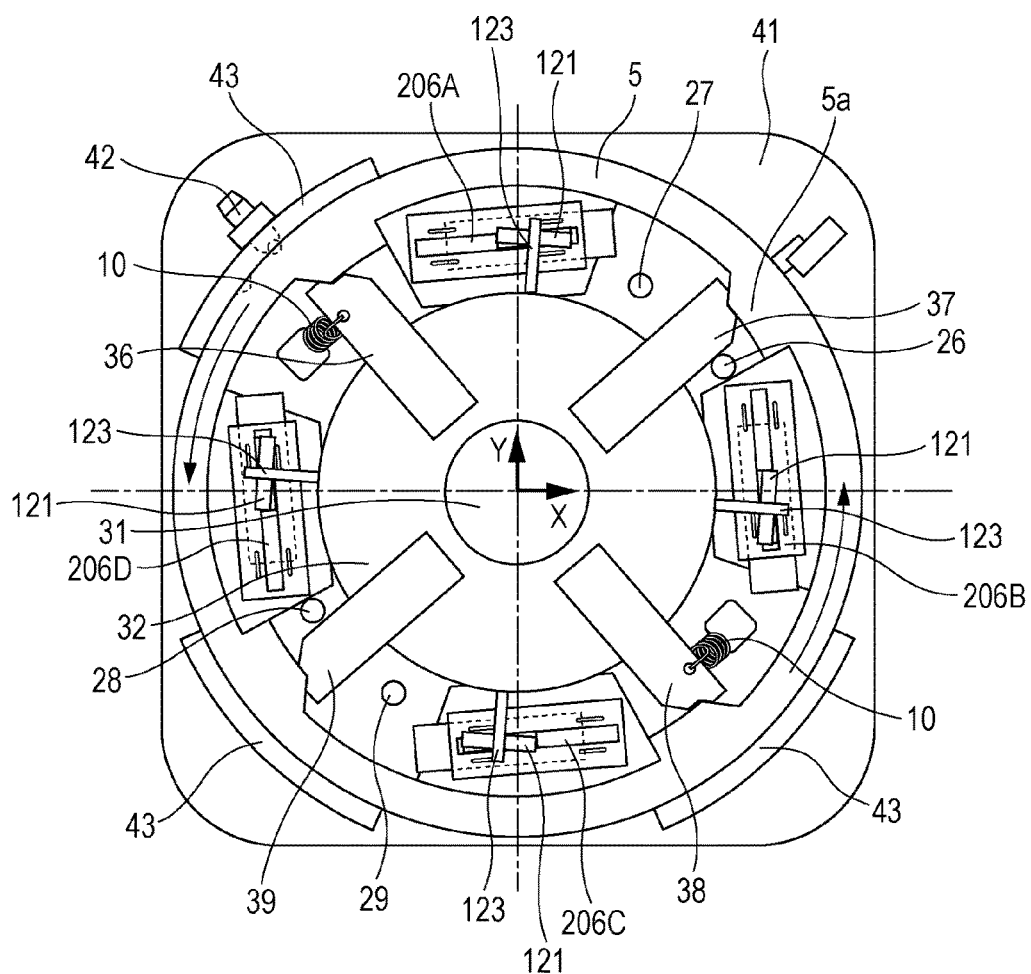

[Fig. 15]
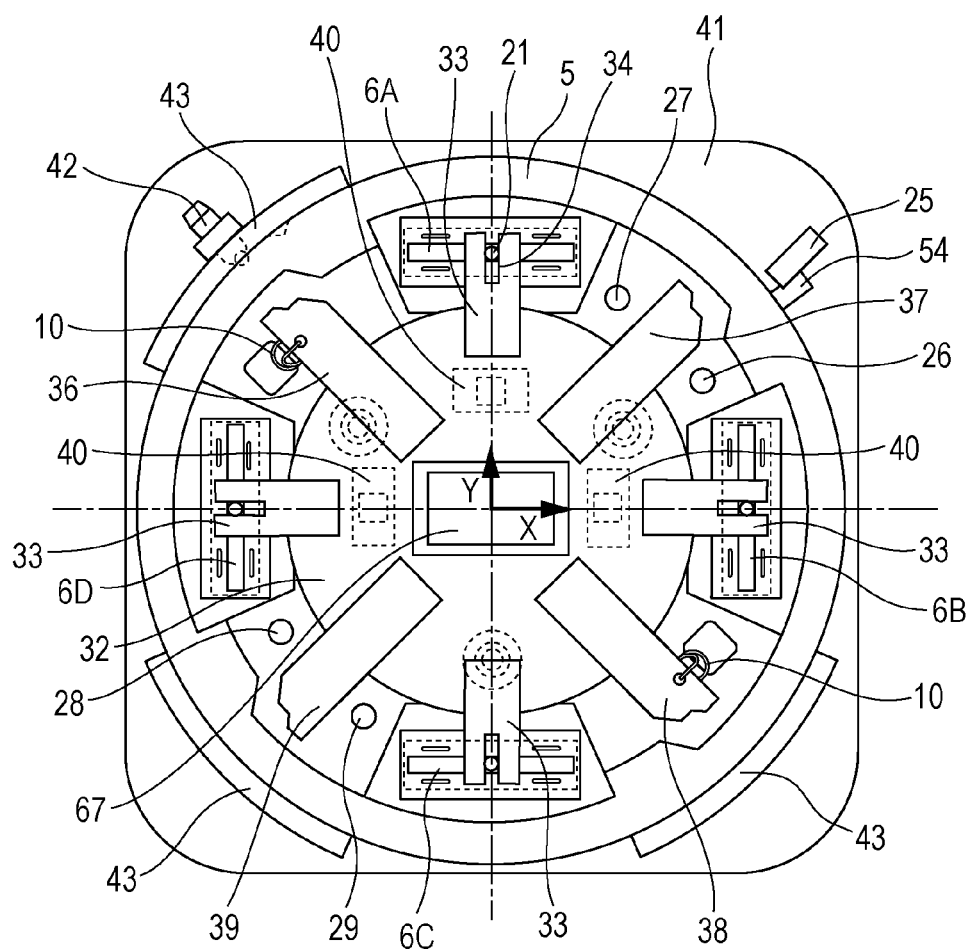

CORRECTING OPTICAL DEVICE, IMAGE DEFLECTION CORRECTING DEVICE AND IMAGING DEVICE

TECHNICAL FIELD

The present invention relates to a correcting optical device, an image deflection correcting device and an imaging device. For example, the present invention relates to a correcting optical device provided with a holding structure for holding a correction lens which is moved for image deflection correction while movement of the correction lens is regulated when correction is not being made, an image deflection correcting device provided with a holding structure for holding an image pickup device which is moved for image deflection correction while movement of the image pickup device is regulated when correction is not being made, and an imaging device provided with one of the correcting optical device and the image deflection correcting device.

BACKGROUND ART

A correcting optical device provided with a correcting optical system which prevents image deflection by causing a correction lens to move translationally in a plane perpendicular to the optical axis thereof has been proposed. Some of these correcting optical devices are provided with a holding structure for regulating movement of a movable part which supports the correction lens and fixing the correction lens when image deflection correction is not being made.

PTL 1 discloses a correcting optical device provided with such a holding structure. In the disclosed correcting optical device, movement of a correction lens is regulated by rotating a lock ring so as to engage projections of a support frame of the correction lens with an inner surface of the lock ring.

CITATION LIST

Patent Literature

PTL 1: Japanese Patent No. 03397536

SUMMARY OF INVENTION

Technical Problem

However, the device disclosed in PTL 1 requires a drive unit for rotating the lock ring to switch the movable part including the correction lens to a movable state, i.e., a correctable state, from a fixed state. Further, an actuator for holding the lock ring in the correctable state is also required. For these reasons, the disclosed device is not necessarily satisfactory in device size, cost and power consumption.

An aspect of the present invention relates to, for example, a correcting optical device, an image deflection correcting device and an imaging device capable of reducing in at least one of size, cost and power consumption.

Solution to Problem

An aspect of the present invention relates to a correcting optical device including: a fixing member; a rotating member rotatably supported with respect to the fixing member in a plane perpendicular to an optical axis of the correcting optical device; a movable member supported to be movable in parallel with the fixing member in the plane perpendicular to the optical axis of the correcting optical device and configured to hold a lens (for example, a correction lens); at least first and second drive units provided between the movable member and the rotating member, and configured to produce driving force for moving the movable member; and at least first and second contact members configured to limit a movable range of the movable member, wherein for the regulation of movement of the movable member, rotational driving force is produced by the first and second drive units and, the rotating member is rotated in the opposite direction of the rotational direction of the movable member after the movable member is rotated to be brought into contact with the first contact member, whereby an engaging portion formed in the rotating member and an engaging portion formed in the movable member engage each other to regulate translational movement of the movable member and, for image deflection correction, rotational driving force in the opposite direction of the rotational force is produced and, the rotating member is rotated in the opposite direction of the rotational direction of the movable member after the movable member is rotated to be brought into contact with the second contact member, whereby engagement between the rotating member and the movable member is released.

Another aspect of the present invention relates to a correcting optical device including: a fixing member; a rotating member rotatably supported with respect to the fixing member in a plane perpendicular to an optical axis of the correcting optical device; a movable member supported to be movable in parallel with the fixing member in the plane perpendicular to the optical axis of the correcting optical device and configured to hold a lens (for example, a correction lens); a drive unit provided in the rotating member and configured to cause relative displacement between the rotating member and the movable member; a contact member provided in the fixing member and configured to regulate movement of the movable member; and a positioning mechanism provided in the fixing member and configured to cause the rotating member to be movable when force greater than predetermined force is applied to the rotating member.

A yet another aspect of the present invention relates to an imaging device which includes: any one of the correcting optical devices described above; and an image pickup device provided at a position at which light transmitted the lens provided in the correcting optical device enters.

A further aspect of the present invention relates to an image deflection correcting device including: a fixing member; a rotating member rotatably supported with respect to the fixing member in a plane parallel to a light-receiving surface of an image pickup device; a movable member supported to be movable in parallel with the fixing member in the plane perpendicular to an optical axis of a correcting optical device and configured to hold an image pickup device; at least first and second drive units provided between the movable member and the rotating member, and configured to produce driving force for moving the movable member; and at least first and second contact members configured to limit a movable range of the movable member, wherein for the regulation of movement of the movable member, the first and second drive units produce rotational driving force and, the rotating member is rotated in the opposite direction of the rotational direction of the movable member after the movable member is rotated to be brought into contact with the first contact member, whereby an engaging portion formed in the rotating member and an engaging portion formed in the movable member engage each other to regulate transitional movement of the movable member and, for image deflection correction, rotational driving force in the opposite direction of the rotational force is produced and, the rotating member is rotated in the opposite direction of the rotational direction of the movable member after the movable member is rotated to be brought into contact with the second contact member, whereby engagement between the rotating member and the movable member is released.

A further aspect of the present invention relates to an image deflection correcting device including: a fixing member; a rotating member rotatably supported with respect to the fixing member in a plane parallel to a light-receiving surface of an image pickup device, a movable member supported to be movable in parallel with the fixing member in the plane perpendicular to an optical axis of a correcting optical device and configured to hold an image pickup device; a drive unit provided in the rotating member and configured to cause relative displacement between the rotating member and the movable member; a contact member provided in the fixing member and configured to regulate movement of the movable member; and a positioning mechanism provided in the fixing member and configured to cause the rotating member to be movable when force greater than predetermined force is applied to the rotating member.

A further aspect of the present invention relates to an imaging device which includes any one of the image deflection correcting devices described above and an imaging optical system, wherein light which transmitted the imaging optical system enters the image pickup device.

In this description, a plane perpendicular to a certain axis means a plane substantially perpendicular to the certain axis, and design tolerance and manufacturing tolerance are allowed. A plane parallel to a certain surface means a plane substantially parallel to the certain plane, and design tolerance and manufacturing tolerance are allowed. Similarly, a situation "A and B are parallel" includes not only a situation in which A and B are perfectly parallel but also a situation in which A and B are substantially parallel, and design tolerance, manufacturing tolerance and the like are allowed. The situation "A and B are perpendicular" includes not only a situation that A and B are perpendicular but also a situation in which A and B are substantially perpendicular. The situation "A and B cross perpendicularly each other" includes not only a situation in which A and B cross each other at 90 degrees but also a situation in which A and B cross substantially perpendicularly each other, and design tolerance, manufacturing tolerance and the like are allowed.

Advantageous Effects of Invention

An aspect of the present invention can implement a correcting optical device, an image deflection correcting device or an imaging device capable of reducing in size, cost and power consumption.

Further features of the present invention will become apparent from the following description of exemplary embodiments with reference to the attached drawings.

BRIEF DESCRIPTION OF DRAWINGS

FIG. 1 is a plan view of a correcting optical device.
FIG. 2 is a plan view of the correcting optical device with a movable plate excluded therefrom.
FIG. 3 is a cross-sectional view of the correcting optical device.
FIG. 4 is a plan view illustrating the process of a lock operation.
FIG. 5 is a plan view of a locked state.
FIG. 6 is a plan view illustrating the process of a lock release operation.
FIG. 7 is a plan view illustrating the process of the lock release operation.
FIG. 8A is a detail view of a positioning mechanism.
FIG. 8B is a detail view of the positioning mechanism.
FIG. 8C is a detail view of the positioning mechanism.
FIG. 9 is a cross-sectional view of a camera in which the correcting optical device is configured.
FIG. 10A is a detailed perspective view of a driving unit.
FIG. 10B is a detailed perspective view of the driving unit.
FIG. 11A is a detail view of a vibrator.
FIG. 11B is a detail view of the vibrator.
FIG. 12A is an explanatory view of a vibration mode of the vibrator.
FIG. 12B is an explanatory view of a vibration mode of the vibrator.
FIG. 13A is a detailed perspective view of the driving unit.
FIG. 13B is a detailed perspective view of the driving unit.
FIG. 13C is a detailed perspective view of the driving unit.
FIG. 14 is a plan view of a locked state.
FIG. 15 is a plan view of a correcting optical device.

DESCRIPTION OF EMBODIMENTS

Hereinafter, embodiments to implement the present invention will be described with reference to the following embodiments.

First Embodiment

As the first embodiment, an exemplary configuration of a correcting optical device configured to correct image deflection using a lens (for example, a correction lens) to which the present invention is applied and, at the same time, to regulate a movement of the correction lens when the image deflection correction is not being performed will be described with reference to FIGS. 1 to 12B.

FIG. 9 is a cross-sectional view of a camera which includes a correcting optical device 1 according to this embodiment. The camera of FIG. 9 has a function to capture moving images and still images. The reference numeral 61 denotes a lens barrel and 62 denotes a camera body. The reference numeral 1 denotes a correcting optical device built in the lens barrel 61. The correcting optical device 1 of this embodiment includes a correction lens 31 and a movable plate (movable member) 32 which holds the correction lens 31. The movable plate 32 is moved in parallel in a surface perpendicular to an optical axis 2 of the correcting optical device 1 by a rotating ring 5 and a drive unit 6 provided on the rotating ring 5.

Although not illustrated in FIG. 9, an imaging optical system other than the correction lens 31, an acceleration sensor for detecting deflection of the lens barrel 61, and encoders for detecting two-dimensional movement of the movable plate 32 are provided in the lens barrel 61. Further, a power supply for supplying the drive unit with electrical energy, and a control unit for processing signals of the acceleration sensor and signals of the encoder and manipulating the power supply are provided in the lens barrel 61.

An image pickup device 67 is provided inside the camera body 62. Light from a subject transmits the imaging optical system including the correction lens 31 in the lens barrel 61 and enters the image pickup device 67 in the camera body 62. In accordance with the signals of the acceleration sensor, the correction lens 31 is moved by the correcting optical device 1, whereby deflection of the image may be corrected.

FIG. 1 is a plan view of the correcting optical device 1 of this embodiment. The correcting optical device 1 includes a holder plate (fixing member) 41 which is a base member and the rotating ring (rotating member) 5 which is rotatably supported by the holder plate 41. In the holder plate 41, three curved guide portions 43 for guiding the rotating ring 5 are provided. Inside the rotating ring 5, a movable plate (movable member) 32 held about the correction lens 31 is provided.

FIG. 2 is a plan view of the correcting optical device 1 with the movable plate 32 excluded therefrom. FIG. 3 is a cross sectional view taken along line III-III in FIG. 2.

Three encoders 24 for detecting a position of the movable plate 32 are provided in the holder plate 41. Three ball receivers 18 are provided at positions at equal distance from the center of the holder plate 41 in an equilateral triangle arrangement. A circular recessed portion is formed in an upper portion of the ball receiver 18. A ball 19 is received in this recessed portion and the movable plate 32 is placed such that a lower surface thereof is in contact with the three balls 19.

Four projecting portions 36 to 39 projecting outside are provided on an upper surface of the movable plate 32. A tensile coil spring 10 is suspended between the projecting portion 36 and the holder plate 41 and between the projecting portion 38 and the holder plate 41. Therefore, since the movable plate 32 is in contact with the balls 19 while always being urged against the holder plate 41, the movable plate 32 is supported movable in a surface perpendicular to the optical axis 2 of the correcting optical system, i.e., an X-Y surface in the diagram, keeping equal distance from the holder plate 41.

With such a configuration, the movable plate 32 may be moved in parallel with or be rotated with respect to the rotating ring 5 while movement toward the optical axis direction is regulated. The movement of the rotating ring 5 in the optical axis direction is also regulated by a unit which is not illustrated.

The holder plate 41 includes a positioning mechanism with which the rotating ring 5 becomes movable when force greater than the predetermined force is applied to the rotating ring 5. The positioning mechanism includes, for example, two grooves provided in the rotating ring 5, and a fitting member provided in the holder plate 41. When force greater than the predetermined force is applied to the rotating ring 5 in the rotational direction of the rotating ring 5, the fitting member is moved from one groove to the other groove.

Hereinafter, an example of the positioning mechanism will be described in detail. A ball plunger 42 is provided at one of the curved guide portions 43 for the positioning of the rotational position of the rotating ring 5. This positioning mechanism will be described with reference to FIGS. 8A to 8C. The ball plunger 42 includes a ball 42a which is urged by an internal spring and is exposed to a front end of the ball plunger 42. The ball 42a retracts when predetermined pressure is applied thereto and the ball 42a returns to its original position when the pressure is released. A male screw is formed on a side surface of the ball plunger 42. The male screw engages a female screw formed on the curved guide portion 43. The reference numeral 42b denotes a nut. After the ball plunger 42 is positioned, the nut 42b is tightened so that the ball plunger 42 is fixed.

Positioning grooves 55 and 56 are formed in the rotating ring 5. When the rotating ring 5 is located at a position illustrated in FIG. 8A, the ball 42a of the ball plunger 42 fits into the positioning groove 55 and the rotating ring 5 is positioned at the rotational position in FIG. 8A. When rotational force in the counterclockwise direction greater than the predetermined force is applied to the rotating ring 5, the ball 42a is pressed by a slope of the positioning groove 55 and made to retract. Then, the rotating ring 5 is rotated as illustrated in FIG. 8B. As illustrated in FIG. 8C, when the rotating ring 5 is rotated until the positioning groove 56 reaches the position corresponding to the ball 42a, the ball 42a is again pressed by the urging force of the spring and is fit into the positioning groove 56. When the rotational force against the rotating ring 5 is released, the rotating ring 5 is positioned at the position illustrated in FIG. 8C. When the rotating ring 5 is to be returned to the position illustrated in FIG. 8A, it is only necessary to apply rotational force greater than the predetermined force in the clockwise direction to the rotating ring 5.

As illustrated in FIG. 1, a photo interrupter 25 attached to the holder plate 41 and a light shielding plate 54 formed on a peripheral surface of the rotating ring 5 are provided as detection unit for detecting the rotational position of the rotating ring 5. When the rotating ring 5 is positioned at the positions illustrated in FIGS. 8A and 8C, the light shielding plate 54 does not block the light of the photo interrupter 25. When the rotating ring 5 is positioned between the positions illustrated in FIGS. 8A and 8C, e.g., the position illustrated in FIG. 8B, the light shielding plate 54 blocks the light of the photo interrupter 25. Therefore, after rotational force is applied to the rotating ring 5, if a signal representing that the light is blocked is issued from the photo interrupter 25, it is detectable that the rotating ring 5 has begun rotation and, if a signal representing that the light has again been received is issued, it is detectable that the rotating ring 5 has been rotated to the predetermined position.

As illustrated by the dashed line in FIG. 1, encoder scales 40 are provided on the reverse side of the movable plate 32 at positions corresponding to the encoders 24. The size of the encoder scale 40 is sufficiently large so that the movable plate 32 does not depart from the position of the encoder 24 even if the movable plate 32 is moved to the maximum distance within its movable range.

Four cylindrical contact members 26 to 29 for restricting the moving range of the movable plate 32 are provided in the holder plate 41. Excessive rotation of the movable plate 32 is restricted when the projecting portions 37 and 39 are brought into contact with the contact members 26 to 29.

As the drive unit 6 which causes the movable plate 32 to move translationally for the image deflection correction, a vibration type drive unit is used in this embodiment. Four vibration type drive units 6 (6A, 6B, 6C and 6D) are arranged on the rotating ring 5 at positions other than the correction lens 31 so as not to obstruct the optical path and, at the same time, at positions to equally divide the rotating ring 5 in the circumferential direction.

When vibration, which will be described later, is excited, the vibration type drive unit 6 may drive a driven member which is in pressure contact therewith to move linearly forward and backward by frictional force. Therefore, the vibration type drive unit 6 may cause relative displacement between the movable plate 32 and the rotating ring 5. The driving direction of the vibration type drive units 6A and 6C is the X direction in the diagram and the driving direction of the vibration type drive units 6B and 6D is the Y direction in the diagram.

Here, a configuration of the vibration type drive unit 6 will be described.

FIGS. 10A and 10B are perspective views of the vibration type drive unit 6. FIG. 10B illustrates an attachment configuration of components, which are developed in the Z direction in the diagram. The reference numeral 101 denotes a unit base and 103 denotes a spring. The reference numeral 8 denotes a vibrator and 22 denotes a plate-shaped abrasion proof member which functions as a friction member. The reference numeral 35 denotes ceramic balls, and 21 denotes a cylindrical driving force transmitting unit which is integrally combined with the abrasion proof member 22 and forms a driven member 45. The reference numeral 102 denotes a unit top. The unit base 101 and the unit top 102 are fixed by screws which are not illustrated and fix positions of other components in the Z direction in the diagram. The driving direction of the vibrator 8 corresponds to the X direction in the diagram. A vibrator fixing portion 15 is fixed to the unit base 101.

The spring 103 is provided between the unit base 101 and the vibrator 8 and has a function to bring the vibrator 8 in pressure contact with the abrasion proof member 22.

FIGS. 11A and 11B are perspective views of the vibrator 8. The vibrator 8 includes a piezoelectric ceramic 11 which is a rectangular plate-shaped electromechanical energy conversion element, a plate-shaped magnetic vibrator plate 12 made of metal, and a flexible printed circuit board 13 which is an electric conductive member for supplying the piezoelectric element with electrical energy. The vibrator plate 12 includes two projecting portions 14, two vibrator fixing portions 15, four vibrator support beam portions 16 and a vibrator base portion 17. These are formed integrally. The vibrator base portion 17 of the vibrator plate 12 is bonded to the piezoelectric ceramic 11 with an adhesive. The flexible printed circuit board 13 is bonded to the piezoelectric ceramic 11 with an adhesive. The piezoelectric ceramic 11 includes an internal electrode which is laminated in the thickness direction and an exterior electrode which electrically connects the internal electrode to wiring included in the flexible printed circuit board 13. The flexible printed circuit board 13 is electrically connected with a power supply.

Here, an operation of the vibrator 8 will be described.

An alternation voltage is applied to the piezoelectric ceramic 11 and vibration in two vibration modes is excited in the vibrator 8. The two vibration modes are illustrated in FIGS. 12A and 12B. The vibration mode of FIG. 12A is referred to as A mode. The vibration mode of FIG. 12B is referred to as B mode. In the vibration mode illustrated in FIG. 12A (A mode), upper surfaces of the projecting portions 14 oscillate in the longitudinal direction of the vibrator 8 (also referred to as a feed direction: the X direction in the diagram). In the vibration mode illustrated in FIG. 12B (B mode), the upper surfaces of the projecting portions 14 oscillate in the contact direction with the driven member 45 (also referred to as a raising direction: the Z direction in the diagram). The alternation voltage is set such that the time phase difference between the vibration of these two vibration modes is substantially 90 degrees. Here, "substantially 90 degrees" means that the time phase difference is not necessarily exactly 90 degrees but includes a range of phase of which necessary vibration is composed. Hereinafter, the term "substantially" in the present invention has the same meaning. Therefore, the upper surfaces of the projecting portions 14 are moved to follow elliptical tracks on a plane parallel to the XZ plane in the diagram. If the phase difference of vibration of the two vibration modes is set to be substantially −90 degrees, the two upper surfaces of the projecting portions 14 may move in the opposite directions of the elliptical tracks. Therefore, it is possible to drive, toward the X direction in the diagram, the driven member 45 which includes the abrasion proof member 22 which is in pressure contact with the upper surfaces of the projecting portions 14.

Although a case in which two vibration modes are excited in the vibrator 8 and the upper surfaces of the projecting portions 14 are made to perform elliptic movement has been described here, the vibration modes of the vibrator and the form of the vibrator are not limited to the same. For example, a vibrator which includes a single projecting portion and has a vibration mode in which the projecting portion is oscillated in the Z direction in the diagram may also be used. In this case, the driven member 45 may be driven by bringing the projecting portion into contact with a contact surface of the driven member 45 with the vibrator in a tilted and non-vertical manner.

Four slots are provided in the abrasion proof member 22. Four ceramic balls 35 are in contact with the slots. Two slots on the near side in the Y direction in the diagram have the shapes in which V-shaped slots are extended in the X direction. Two slot on the far side in the Y direction in the diagram have the shapes in which recessed groove shapes are extended in the X direction. Four slots are provided also in the unit top 102. Four ceramic balls 35 are in contact with the unit top 102. All of the four slots have the shapes in which V-shaped slots are extended in the X direction. The abrasion proof member 22, the ceramic balls 35 and the unit top 102 are in pressure contact with one another in the Z direction by the spring 103. With this configuration, the ceramic balls 35 may roll in the X direction in the diagram. In addition, the ceramic balls 35 are not allowed to roll in directions other than the X direction including the Y direction in the diagram.

In FIG. 1, the movable plate 32 includes four U-shaped guide members 33 which extends from the center of the movable plate 32 in the negative and positive X directions and in the negative and positive Y directions in the diagram. As illustrated also in FIGS. 10A and 10B, the driving force transmitting unit 21 of each of the four vibration type drive units 6 (6A, 6B, 6C and 6D) is inserted in a slit portion 34 of the guide member 33. The slit portion 34 extends in the direction which perpendicularly crosses the driving direction of the drive units 6A, 6B, 6C or 6D and the optical axis 2. The width of the slit portion 34 is determined to be constant in the longitudinal direction thereof and such that the driving force transmitting unit 21 may slide smoothly with clearance as small as possible. Further, a lubricant is applied to a contact surface between the guide member 33 and the driving force transmitting unit 21 so that sliding load is substantially eliminated. There is no restraint regarding the relative position in the Z direction in the diagram by this mechanism.

When the vibration type drive units 6A and 6C are driven in the same direction, the movable plate 32 may be moved in the X direction. Since the direction in which the vibration type drive units 6B and 6D may be driven is the Y direction, the vibration type drive units 6B and 6D do not contribute to the movement of the movable plate 32. In this case, since the driving force transmitting units 21 of the vibration type drive units 6B and 6D may be moved smoothly along the slit portions 34 of the corresponding guide members 33, no load which disturbs movement of the movable plate 32 in the X direction is generated.

When the vibration type drive units 6B and 6D are driven in the same direction, the movable plate 32 may be moved in the Y direction. Therefore, based on the same principle as described above, since the vibration type drive units 6A and 6C may be moved smoothly along the slit portions 34 of the guide members 33 corresponding to the driving force transmitting units 21 of the vibration type drive units 6A and 6C, no load which disturbs the movement in the Y direction is generated.

The components are arranged such that the driving directions thereof cross perpendicularly each other. A combination of these drives enables the movable plate 32 to be moved in different two-dimensional directions in the XY plane.

In this embodiment, the movable plate 32 may be moved in different two-dimensional directions by the four vibration type drive units 6 of which driving directions cross perpendicularly one another. Alternatively, however, if three vibration type drive units are provided and disposed so that driving directions thereof cross at 120 degrees one another, the movable plate 32 may be moved in two-dimensional directions in the same manner as in this embodiment.

Next, a control method of the correcting optical device 1 in an image deflection correcting mode will be described. In the image deflection correcting mode, an amount of image deflection is first input from a camera or an unillustrated vibration detection sensor of a lens body in an unillustrated CPU for lens drive unit. The CPU calculates a driving amount of the correcting optical system necessary for the image deflection correction on the basis of the input amount of image deflection, and outputs the calculated driving amount to the four vibration type drive units 6A to 6D as drive signals. The vibration type drive units 6A to 6D produce driving force in accordance with the output signals and cause the movable plate 32 to move in the plane perpendicular to the optical axis 2. Position information about the movable plate 32 is detected by the three encoders 24 provided in the holder plate 41 reading the encoder scales 40 and is fed back to the CPU. The CPU calculates the driving amount of the correcting optical system on the basis of the fed-back position information and an amount of image deflection newly input from the vibration detection sensor, and outputs drive signals in accordance with the calculated driving amount to the vibration type drive units 6A to 6D. The correcting optical device 1 performs image deflection correction continuously by repeating the above-described operation.

Next, a lock method and a lock release method of the movable plate 32 will be described with reference to FIGS. 1 and 4 to 7.

First, an operation in which image deflection correction is switched from an ON state to an OFF state, i.e., a locked state, will be described. FIG. 1 illustrates the ON state of the image deflection correction in which the movable plate 32 is not in contact with the rotating ring 5 at any point. Therefore, the movable plate 32 may be moved in parallel and be rotated in the plane perpendicular to the optical axis 2. The rotating ring 5 is positioned at the position illustrated in the diagram by the ball plunger 42 and, at the same time, is moved to one side by urging force of the ball plunger 42.

Since the movable plate 32 is supported movably via the rollable three balls 19, resistance to rotational force is obviously small as compared with the rotating ring 5. Therefore, the correcting optical device 1 is configured such that the force required for the rotating ring 5 to begin rotation with respect to the holder plate 41 is greater than the force required for the movable plate 32 to begin rotation with respect to the rotating ring 5.

When the correcting optical device 1 receives an image deflection correction OFF signal, the center of the correction lens 31 is made to substantially coincide with the optical axis of the imaging device. Then, the drive signals are input in the vibration type drive units 6A to 6D so that rotational force (rotational driving force) with which the movable plate 32 is rotated in the clockwise direction with respect to the rotating ring 5 is produced. In particular, the drive signals with which the driven member 45 of the vibration type drive unit 6A is moved in the positive X direction, the driven member 45 of the vibration type drive unit 6C is moved in the negative X direction, the driven member 45 of the vibration type drive unit 6B is moved in the negative Y direction, and the driven member 45 of the vibration type drive unit 6D is moved in the positive Y direction are output.

In accordance with the drive signals, the movable plate 32 with smaller resistance as described above is first rotated in the clockwise direction as illustrated in FIG. 4, and the projecting portions 37 and 39 are brought into contact with the contact members 26 and 28. When the drive signals are applied continuously, although further rotation of the movable plate 32 is not allowed, since the vibration type drive units 6A to 6D are attached to the rotating ring 5 which is rotatably supported by the holder plate 41, reaction force of the above-described rotational force is applied to the rotating ring 5. Since the rotational force at this time is sufficiently large to make the ball 42a of the ball plunger 42 retract against urging force, the rotating ring 5 is rotated in the counterclockwise direction illustrated by arrows in FIG. 5.

When the photo interrupter 25 detects that the rotating ring 5 has been rotated to the position illustrated in FIG. 5, the drive signals being sent to the vibration type drive units 6A to 6D are stopped. The rotating ring 5 is positioned at the position illustrated in FIG. 5 by the ball 42a of the ball plunger 42 being fit into the positioning groove 55. At this time, projecting portions 5a of the rotating ring 5 engage recessed portions (engaging portions) 36a to 39a formed in the four projecting portions 36 to 39 of the movable plate 32. Then, the movable plate 32 is not allowed to move in other directions than the counterclockwise direction, and the state of the movable plate 32 is changed into the image deflection correction OFF state, i.e., the locked state.

Subsequently, a method to release the locked state will be described. When the lock is released and the movable plate 32 is to return to the image deflection correcting mode again, from the locked state illustrated in FIG. 5, the drive signals are output to the vibration type drive units 6A to 6D and the drive signals are provided so that rotational force in the counterclockwise direction is applied to the movable plate 32. In particular, the drive signals with which the driven member 45 of the vibration type drive unit 6A is moved in the negative X direction, the driven member 45 of the vibration type drive unit 6C is moved in the positive X direction, the driven member 45 of the vibration type drive unit 6B is moved in the positive Y direction, and the driven member 45 of the vibration type drive unit 6D is moved in the negative Y direction, which are the opposite directions to those described above, are output.

At this time, since the rotating ring 5 is positioned at the position illustrated in FIG. 5 by the ball plunger 42, the movable plate 32 with smaller resistance to rotational force is rotated in the counterclockwise direction as illustrated in FIG. 6. As a result, the projecting portions 37 and 39 are in turn brought into contact with the contact member 27 and 29. When the drive signals are applied continuously, since further rotation of the movable plate 32 is not allowed, reaction force of this rotational force is applied to the rotating ring 5. Since the rotational force at this time is sufficiently large to make the ball 42a of the ball plunger 42 retract against urging force, the rotating ring 5 is rotated in the clockwise direction illustrated by arrows in FIG. 7. When the photo interrupter 25 detects that the rotating ring 5 has been rotated to the predetermined position, the drive signals being sent to the vibration type drive units 6A to 6D are stopped.

In this state, the projecting portions 37 and 39 are still in contact with the contact members 27 and 29. Therefore, the CPU again outputs the drive signals to the vibration type drive units 6A to 6D so as to produce rotational force with which the movable plate 32 is rotated in the clockwise direction with respect to the rotating ring 5. Then, the projecting portions 37 and 39 may be separated from the contact members 27 and 29 as illustrated in FIG. 1 and the correcting optical device 1 is again returned to the state in which the movable plate 32 is movable in parallel. Therefore, the movable plate 32 and the rotating ring 5 are not in contact with each other at any point and the state of the correcting optical device 1 returns to the image deflection correction ON state.

In the manner described above, the correcting optical device 1 is switched into the image deflection correcting mode.

With the configuration described above, since a correction lens driving unit may also function as a rotation driving unit of the rotating ring (lock ring), it is not necessary to provide a dedicated drive unit for the lock. Therefore, a correcting optical device which is reduced in cost, size and power consumption can be provided.

Here, a case in which, when the movable plate 32 is to be locked, the rotating ring 5 is rotated in the counterclockwise direction after the movable plate 32 is rotated in the clockwise direction has been described. However, the present invention is not limited to the same and includes, for example, a case in which the rotating ring 5 is rotated in the clockwise direction after the movable plate 32 is rotated in the counterclockwise direction. The same principle may be applied to the lock release.

Second Embodiment

A second embodiment will be described with reference to FIGS. 13A to 13C which illustrate details of a vibration type drive unit 6 and FIG. 14 which illustrates a locked state of a movable plate 32.

In the first embodiment, the driven member 45 is configured by the cylindrical driving force transmitting unit 21 and the abrasion proof member 22 which are integrally combined with each other and the driving force transmitting unit 21 is inserted in each of the four U-shaped guide members 33 provided in the movable plate 32. However, the components may also be in reverse configuration. That is, as illustrated in FIGS. 13A and 13B, a U-shaped driving force transmitting unit 121 and an abrasion proof member 22 are combined integrally to form a driven member 145 and four cylindrical members 123 are provided in a movable plate 32. Each of the cylindrical members 123 extends from the center of the movable plate 32 in the X direction and the Y direction in FIGS. 14A to 14C.

The width of a slit portion 120 of the driving force transmitting unit 121 is determined to be constant in the longitudinal direction thereof and so that the cylindrical member 123 may slide smoothly with clearance as small as possible. Further, a lubricant is applied to a contact surface between the cylindrical member 123 and the driving force transmitting unit 121 so that sliding load is substantially eliminated. There is no restraint regarding the relative position in the Z direction in the diagram by this mechanism.

FIG. 13C is a perspective view of the driving force transmitting unit 121. The X direction corresponds to the driving direction of the vibration type drive unit 6. The Z direction corresponds to the direction in which a vibrator 8 and the driven member 145 are brought into contact with each other. In FIG. 13C, components are developed in the Z direction.

The driving force transmitting unit 121 is constituted by a driving force transmitting unit lower portion 104 and a driving force transmitting unit upper portion 105.

A lower surface of the driving force transmitting unit lower portion 104 in the diagram is fixed to the abrasion proof member 22. The driving force transmitting unit lower portion 104 includes a round bar-shaped shaft 106. A central axis 109 of the shaft 106 is in parallel with the Z direction in the diagram. Rigid film is provided and a lubricant is applied to a surface of the shaft 106. The driving force transmitting unit upper portion 105 includes a slit portion 120 and a circular hole portion 107. A central axis of the circular hole portion 107 coincides with the central axis 109 of the shaft 106 of the driving force transmitting unit lower portion 104. Rigid film is provided and a lubricant is applied to a surface of the circular hole portion 107.

The driving force transmitting unit lower portion 104 and the driving force transmitting unit upper portion 105 engage each other with the shaft 106 being inserted in the circular hole portion 107 in a fit state. A rotation mechanism 108 is constituted by the circular hole portion 107 and the shaft 106. A rotational axis of this rotation mechanism is the central axis 109 which extends in the direction crossing perpendicularly a surface on which the vibrator 8 and the driven member 145 are in contact with each other.

Although the cylindrical member 123 and the driving direction of the driven member 145 cross perpendicularly in a state of an image deflection correcting mode, the cylindrical member 123 and the driving direction of the driven member 145 does not cross perpendicularly in a locked state of the movable plate 32 as illustrated in FIG. 14. The rotation mechanism 108 is provided to accept this difference in the angle.

Third Embodiment

Although a case in which the movable plate (movable member) 32 holds the correction lens 31 has been described in the first and second embodiments, the form of the present invention is not limited to the same. For example, the present invention may also be applied to a case in which the movable plate 32 holds an image pickup device 67 instead of the correction lens 31. In this case, the image deflection correcting device is built in a camera body 62 instead of in a lens barrel 61, and corrects image deflection by causing the image pickup device to move translationally. Note that, since the movable plate 32 is rotated when an image deflection correction ON state is switched to an image deflection correction OFF state, data of an image obtained by the image pickup device 67 is also rotated. Therefore, on the basis of data obtained in one of the image deflection correction ON state and the image deflection correction OFF state, data obtained in the other of the states may be corrected by the rotation angle using a logical circuit, such as a CPU. Therefore, in a case in which image deflection is corrected by moving the image pickup device 67, an image which has not been affected by rotation of the image pickup device 67 may be obtained regardless of the state of the image deflection correction. As illustrated in FIG. 15, in this embodiment, the movable plate 32 is configured to be moved in parallel in a surface perpendicular to an optical axis of an image deflection correcting device by a rotating ring 5 rotatably supported by a fixing member in a plane parallel to a light-receiving surface of the image pickup device 67 and a drive unit 6 provided in the rotating ring 5. Configurations of other elements may be the same as those of the first or second embodiment. With the configuration of this embodiment, in accordance with signals of an acceleration sensor, image deflection may be corrected by causing the image pickup device 67 to move by the image deflection correcting device.

Fourth Embodiment

The vibration type actuator is used in embodiments 1 to 3. In a vibration type actuator, when drive signals are applied to an electrical-mechanical energy converting element provided in a vibrator, elliptic movement in two bending modes in which nodal lines cross substantially perpendicularly each other is excited in this vibrator and a driven member is friction-driven by this elliptic movement.

However, the drive unit is not limited to the vibration type actuator. For example, a voice coil motor which is constituted by a drive coil and permanent magnet and which converts electrical energy into mechanical energy using a magnetic flux generated by the permanent magnet may be used as the drive unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-012313, filed Jan. 25, 2013 which is hereby incorporated by reference herein in its entirety.

REFERENCE SIGNS LIST

1 correcting optical device
2 optical axis
5 rotating ring
6 vibration type drive unit
26 to 29 contact members
31 correction lens
32 and 132 movable plates
41 holder plate
42 ball plunger
55 and 56 positioning grooves

The invention claimed is:
1. A correcting optical device comprising:
a fixing member;
a rotating member rotatably supported with respect to the fixing member in a plane perpendicular to an optical axis of the correcting optical device;
a movable member supported to be movable in parallel to the plane and configured to hold a lens;
at least first and second drive units provided between the movable member and the rotating member, and configured to produce a rotational driving force for moving the movable member; and
at least first and second contact members configured to limit a movable range of the movable member,
wherein the first and second drive units, the rotating member, the movable member, the first contact member, and the second contact member are adapted such that: for the regulation of movement of the movable member, by the rotational driving force produced by the first and second drive units, the rotating member is rotated in an opposite direction of a rotational direction of the movable member after the movable member is rotated in the rotational direction to be brought into contact with the first contact member, whereby an engaging portion formed in the rotating member and an engaging portion formed in the movable member engage each other to regulate translational movement of the movable member; and
wherein for image deflection correction, by a rotational driving force in the opposite direction of the rotational direction produced by the first and second drive units, the rotating member is rotated in the rotational direction with respect to the movable member after the movable member is rotated in the opposite direction to be brought into contact with the second contact member, whereby engagement between the rotating member and the movable member is released.

2. The correcting optical device according to claim 1, wherein at least one of the first drive unit and the second drive unit includes a vibrator including an electrical-mechanical energy converting element provided on the rotating member and a friction member provided on the movable member, or a vibrator including the electrical-mechanical energy converting element provided on the movable member and the friction member provided on the rotating member.

3. The correcting optical device according to claim 2, wherein when drive signals are applied to the electrical-mechanical energy converting element, elliptic movement in first and second bending modes in which nodal lines cross perpendicularly to each other is excited in the vibrator.

4. The correcting optical device according to claim 1, wherein at least one of the first drive unit and the second drive unit includes a drive coil and a permanent magnet, the drive coil being provided on the rotating member and the permanent magnet being provided on the movable member, or the drive coil being provided on the movable member and the permanent magnet being provided on the drive coil.

5. The correcting optical device according to claim 1, further comprising guide members provided on the movable member, the guide members being provided in a position corresponding to the first drive unit and a position corresponding to the second drive unit respectively,
wherein each of the guide members includes a slit portion extending in the direction which crosses perpendicularly a driving direction of the first drive unit or the second drive unit and crosses perpendicularly the optical axis,
wherein each of the first drive unit and the second drive unit includes a cylindrical member which extends parallel to the optical axis of the correcting optical device, and
wherein the cylindrical member is inserted in the slit portion.

6. The correcting optical device according to claim 1, further comprising
a positioning mechanism configured to cause the rotating member to be movable when a force greater than a predetermined force is applied to the rotating member.

7. The correcting optical device according to claim 6, wherein the positioning mechanism includes two grooves provided in the rotating member and a fitting member provided in the fixing member and, when the force greater than the predetermined force is applied to the rotating member in one rotational direction of the rotating member, the fitting member is moved from one groove of the two grooves to the other groove.

8. The correcting optical device according to claim 7, wherein the fitting member is a ball plunger.

9. The correcting optical device according to claim 6, wherein a force required for the rotating member to begin rotation with respect to the fixing member is greater than a force required for the movable member to begin rotation with respect to the fixing member.

10. An imaging device comprising:
the correcting optical device according to claim 6; and
an image pickup device provided at a position at which light transmitted by the lens provided in the correcting optical device enters.

11. The correcting optical device according to claim 6, wherein at least one of the first drive unit and the second drive unit includes a vibrator including an electrical-mechanical energy converting element provided on the rotating member and a friction member provided on the movable member, or a vibrator including the electrical-mechanical energy converting element provided on the movable member and the friction member provided on the rotating member.

12. The correcting optical device according to claim 11, wherein when drive signals are applied to the electrical-mechanical energy converting element, elliptic movement in first and second bending modes in which nodal lines cross perpendicularly to each other is excited in the vibrator.

13. The correcting optical device according to claim 1, wherein a force required for the rotating member to begin rotation with respect to the fixing member is greater than a force required for the movable member to begin rotation with respect to the fixing member.

14. An imaging device comprising:
the correcting optical device according to claim 1; and
an image pickup device provided at a position at which light transmitted by the lens provided in the correcting optical device enters.

15. An image deflection correcting device comprising:
a fixing member;
a rotating member rotatably supported with respect to the fixing member in a plane parallel to a light-receiving surface of an image pickup device;
a movable member supported to be movable in parallel to the plane and configured to hold an image pickup device;
at least first and second drive units provided between the movable member and the rotating member, and configured to produce a rotational driving force for moving the movable member; and
at least first and second contact members configured to limit a movable range of the movable member,
wherein the first and second drive units, the rotating member, the movable member, the first contact member, and the second contact member are adapted such that: for the regulation of movement of the movable member, by the rotational driving force produced by the first and second drive units, the rotating member is rotated in an opposite direction of a rotational direction of the movable member after the movable member is rotated in the rotational direction to be brought into contact with the first contact member, whereby an engaging portion formed in the rotating member and an engaging portion formed in the movable member engage each other to regulate translational movement of the movable member, and
wherein for image deflection correction, by a rotational driving force in the opposite direction of the rotational direction produced by the first and second drive units, the rotating member is rotated in the rotational direction with respect to the movable member after the movable member is rotated in the opposite direction to be brought into contact with the second contact member, whereby engagement between the rotating member and the movable member is released.

16. The image deflection correcting device according to claim 15, wherein at least one of the first drive unit and the second drive unit includes a vibrator including an electrical-mechanical energy converting element provided on the rotating member and a friction member provided on the movable member, or a vibrator including the electrical-mechanical energy converting element provided on the movable member and the friction member provided on the rotating member.

17. The image deflection correcting device according to claim 16, wherein when drive signals are applied to the electrical-mechanical energy converting element, elliptic movement in first and second bending modes in which nodal lines cross perpendicularly to each other is excited in the vibrator.

18. The image deflection correcting device according to claim 15, wherein at least one of the first drive unit and the second drive unit includes a drive coil and a permanent magnet, the drive coil being provided on the rotating member and the permanent magnet being provided on the movable member, or the drive coil being provided on the movable member and the permanent magnet being provided on the drive coil.

19. The image deflection correcting device according to claim 15, further comprising guide members provided on the movable member, the guide members being provided in a position corresponding to the first drive unit and a position corresponding to the second drive unit respectively,
wherein each of the guide members includes a slit portion extending in the direction which crosses perpendicularly a driving direction of the first drive unit or the second drive unit and crosses perpendicularly the optical axis,
wherein at least one of the first drive unit and the second drive unit includes a cylindrical member which extends parallel to the optical axis of the correcting optical device, and
wherein the cylindrical member is inserted in the slit portion.

20. The image deflection correcting device according to claim 15, further comprising
a positioning mechanism configured to cause the rotating member to be movable when a force greater than a predetermined force is applied to the rotating member.

21. The image deflection correcting device according to claim 20, wherein the positioning mechanism includes two grooves provided in the rotating member and a fitting member provided in the fixing member and, when the force greater than the predetermined force is applied to the rotating member in one rotational direction of the rotating member, the fitting member is moved from one groove of the two grooves to the other groove.

22. The image deflection correcting device according to claim 21, wherein the fitting member is a ball plunger.

23. The image deflection correcting device according to claim 20, wherein a force required for the rotating member to begin rotation with respect to the fixing member is greater than a force required for the movable member to begin rotation with respect to the fixing member.

24. An imaging device comprising an image deflection correcting device according to claim 20 and an imaging optical system, wherein light transmitted by the imaging optical system enters the image pickup device.

25. The image deflection correcting device according to claim 20, wherein at least one of the first drive unit and the second drive unit includes a vibrator including an electrical-mechanical energy converting element provided on the rotating member and a friction member provided on the movable member, or a vibrator including the electrical-mechanical energy converting element provided on the movable member and the friction member provided on the rotating member.

26. The image deflection correcting device according to claim 25, wherein when drive signals are applied to the electrical-mechanical energy converting element, elliptic movement in first and second bending modes in which nodal lines cross perpendicularly to each other is excited in the vibrator.

27. The image deflection correcting device according to claim 15, wherein a force required for the rotating member to begin rotation with respect to the fixing member is greater than a force required for the movable member to begin rotation with respect to the fixing member.

28. An imaging device comprising an image deflection correcting device according to claim 15 and an imaging optical system, wherein light transmitted by the imaging optical system enters the image pickup device.

* * * * *